United States Patent
Attia (10) Patent No.: US 9,617,975 B2
(45) Date of Patent: Apr. 11, 2017

(54) WIND TURBINE YAW CONTROL

(75) Inventor: Sid Ahmed Attia, Berlin (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1041 days.

(21) Appl. No.: 13/567,193

(22) Filed: Aug. 6, 2012

(65) Prior Publication Data

US 2014/0037447 A1     Feb. 6, 2014

(51) Int. Cl.
    *F03D 7/02*      (2006.01)
    *F03D 7/04*      (2006.01)
    *F03D 17/00*     (2016.01)

(52) U.S. Cl.
CPC ........... *F03D 7/0204* (2013.01); *F03D 7/048* (2013.01); *F03D 17/00* (2016.05); *F05B 2270/1033* (2013.01); *F05B 2270/20* (2013.01); *Y02E 10/722* (2013.01); *Y02E 10/723* (2013.01)

(58) Field of Classification Search
CPC .......... F03D 7/048; F03D 7/043; F03D 7/045; F03D 7/0296; F03D 7/0204
See application file for complete search history.

(56) References Cited

U.S. PATENT DOCUMENTS

| | | | |
|---|---|---|---|
| 7,299,627 B2 * | 11/2007 | Corten et al. ................... | 60/398 |
| 7,357,622 B2 * | 4/2008 | Corten et al. ................... | 416/1 |
| 7,613,548 B2 | 11/2009 | Cardinal et al. | |
| 7,941,304 B2 | 5/2011 | Gundling et al. | |
| 8,035,241 B2 * | 10/2011 | Subramanian .......... | F03D 7/048 290/44 |
| 2006/0131889 A1 * | 6/2006 | Corten et al. ................... | 290/43 |
| 2007/0124025 A1 * | 5/2007 | Schram et al. ................ | 700/287 |
| 2009/0099702 A1 | 4/2009 | Vyas et al. | |
| 2010/0138201 A1 | 6/2010 | Gundling et al. | |
| 2011/0142619 A1 * | 6/2011 | Subramanian .......... | F03D 7/048 416/1 |
| 2015/0050144 A1 * | 2/2015 | Westergaard ..................... | 416/1 |

FOREIGN PATENT DOCUMENTS

| | | |
|---|---|---|
| WO | 2004/074681 | 9/2004 |
| WO | 2004111446 | 12/2004 |

OTHER PUBLICATIONS

Journal of Wind Engineering and Industrial Aerodynamics, 27 (1988) 237-246, Elsevier Science Publishers B.V., Amsterdam—Printed in the Netherlands.

(Continued)

*Primary Examiner* — Craig Kim
*Assistant Examiner* — Eldon Brockman
(74) *Attorney, Agent, or Firm* — GE Global Patent Operation; Douglas D. Zhang (57) ABSTRACT

A method for operating a wind farm is provided. The method includes determining a wind condition, determining a wake-effect between at least two wind turbines forming at least a sub-set of the wind farm, each of the at least two wind turbines having a yaw system, and determining a desired yaw angle setpoint for each of the at least two wind turbines so that a total power production of at least the sub-set is expected to be increased compared to independently operating the yaw systems of each of the at least two wind turbines. Furthermore, a wind farm is provided.

6 Claims, 8 Drawing Sheets

(56) References Cited

OTHER PUBLICATIONS

Wake Modelling for intermediate and large wind farms, 2007, 1-8, Wind Energy Conference and Exhibition.
Wind farm control; Addressing the aerodynamic interaction among wind turbines, 2009, American Control Conference, St. Louis, MO, USA, 2104-2109.
The Spacing of Wind Turbines in Large Arrays, Pergamon Press, 1977, Energy Conversion, vol. 16, pp. 169-171.
Fatigue loads for wind turbines operating in wakes, Journal of Wind Engineering and Industrial Aerodynamics, 80 (1999) 121-136.

* cited by examiner

WIND TURBINE YAW CONTROL

BACKGROUND OF THE INVENTION

The subject matter described herein relates generally to methods and systems for yaw controlling of a wind turbine, and more particularly, to methods and systems for yaw controlling of wind turbines in a wind farm.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Wind turbines are typically equipped with measurement systems and control systems to enable them to individually react to changing wind conditions. These systems are designed to maximize energy capture while minimizing the impact of fatigue and extreme loads of the individual wind turbines in a wind farm.

Upstream turbines of a wind farm produce a wake that is characterized by a region of reduced wind speed and/or increased wind turbulence. Any wind turbines of the wind farm operating downstream in wake conditions may experience higher fatigue loads and/or lower power capture than expected according to the ambient wind velocity conditions. Accordingly, the power production in wind farms may be reduced.

It would therefore be desirable to provide systems and methods for increasing the annual power production of wind farms.

BRIEF DESCRIPTION OF THE INVENTION

In one aspect, a method for operating a wind farm is provided. The method includes determining a wind condition, determining a wake-effect between at least two wind turbines forming at least a sub-set of the wind farm, each of the at least two wind turbines having a yaw system, and determining a desired yaw angle setpoint for each of the at least two wind turbines so that a total power production of at least the sub-set is greater compared to independently operating the yaw systems of each of the at least two wind turbines.

In another aspect, a method for operating a wind farm is provided. The method includes selecting at least two wind turbines of the wind farm, each of the at least two wind turbines comprising a yaw system operating at a respective current yaw angle setpoint, the at least two wind turbines forming at least a sub-set of the wind turbines of the wind farm, determining an expected wind condition, and determining a desired yaw angle setpoint for each of the at least two wind turbines so that an expected total power production of the sub-set is greater compared to operating the yaw systems of each of the at least two wind turbines with the respective current yaw angle setpoint at the expected wind condition.

In yet another aspect, a wind farm is provided. The wind farm includes at least two wind turbines each of which comprises a rotor comprising a rotor axis, a generator connected to the rotor, and a yaw system which is configured to adjust a yaw angle between the rotor axis and a local wind direction in accordance with a yaw angle setpoint. The wind farm further includes a wind detecting system and a control system. The wind detecting system is configured to determine a wind condition including the local wind direction and a local wind speed for each of the at least two wind turbines. The control system is configured to determine to detect a wake influence between at least two of the at least two wind turbines and a desired yaw angle setpoint for each of the at least two wind turbines so that a total power production of the at least two wind turbines is greater compared to independently operating the yaw systems of each of the at least two wind turbines at the wind condition.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind farm and a method for cooperatively operating the wind turbines of the wind farm taking into account wake effects between the wind turbines. Accordingly, an overall power uptake and an overall power production, respectively, of the wind farm may be improved. More specifically, the yaw control is coordinated at least for a sub-set of wind turbines of the wind farm. Accordingly, a wake interaction between the wind turbines of at least the subset may be reduced in such a way that overall power production of at least the subset is increased. Further, the used area of a wind farm may be reduced when the coordinated yaw control is taken into account in the planning phase of the wind farm.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "normal operation" intends to describe an operating mode of the wind turbine in which kinetic energy of wind is converted to electrical power.

Figure 1:
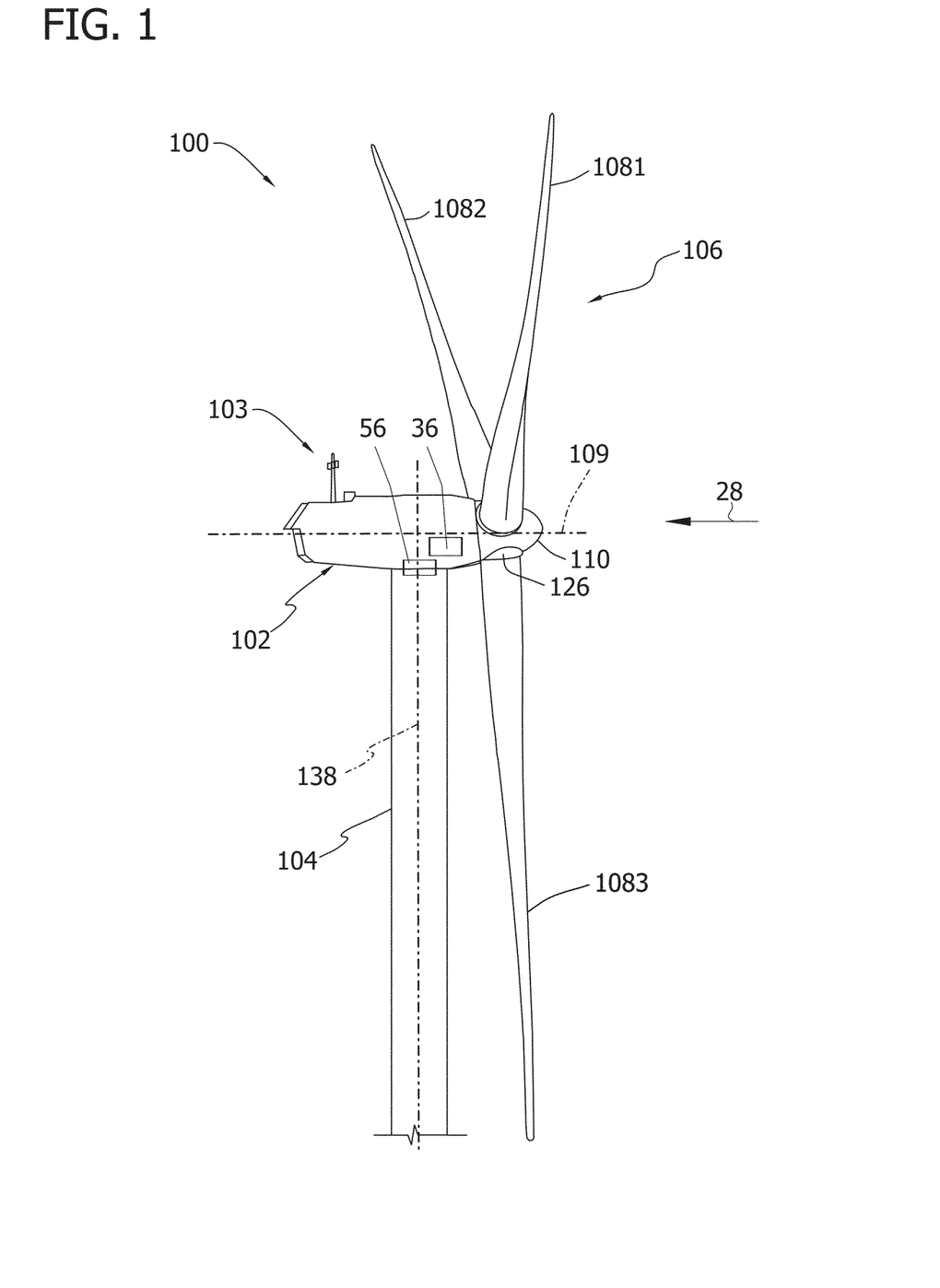
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 1081, 1082, 1083 attached to a rotating hub 110. Alternatively, wind turbine 100 includes any number of blades that facilitates operation of wind turbine 100 as described herein. In the following a rotor with one or more rotor blades is also referred to as a wind rotor. In the exemplary embodiment, wind turbine 100 includes a gearbox (not shown in FIG. 1) operatively coupled to rotor 106 and a generator (not shown in FIG. 1).

In one embodiment, rotor blades 1081, 1082, 1083 have a length ranging from about 15 meters (m) to about 91 m. Alternatively, rotor blades 1081, 1082, 1083 may have any suitable length that enables wind turbine 10 to function as described herein. For example, other non-limiting examples of blade lengths include 10 m or less, 20 m, 37 m, or a length that is greater than 91 m. As wind strikes rotor blades 1081, 1082, 1083 from a direction 28, rotor 106 is rotated about an axis of rotation 109. As rotor blades 1081, 1082, 1083 are rotated and subjected to centrifugal forces, rotor blades 1081, 1082, 1083 are also subjected to various forces and moments. As such, rotor blades 1081, 1082, 1083 may deflect and/or rotate from a neutral, or non-deflected, position to a deflected position.

Moreover, a pitch angle or blade pitch of rotor blades 1081, 1082, 1083, i.e., an angle that determines a perspective of rotor blades 1081, 1082, 1083 with respect to direction 28 of the wind, may be changed by a pitch adjustment system 32 to control the load and power generated by wind turbine 100 by adjusting an angular position of at least one rotor blade 1081, 1082, 1083 relative to wind vectors. During operation of wind turbine 10, pitch adjustment system 32 may change a blade pitch of rotor blades 1081, 1082, 1083 such that rotor blades 1081, 1082, 1083 are moved to a feathered position, such that the perspective of at least one rotor blade 1081, 1082, 1083 relative to wind vectors provides a minimal surface area of rotor blade 1081, 1082, 1083 to be oriented towards the wind vectors, which facilitates reducing a rotational speed of rotor 106 and/or facilitates a stall of rotor 106.

In the exemplary embodiment, a blade pitch of each rotor blade 1081, 1082, 1083 is controlled individually by a control system 36. Alternatively, the blade pitch for all rotor blades 1081, 1082, 1083 may be controlled simultaneously by control system 36.

Nacelle 102 also includes a yaw drive mechanism 56 that may be used to rotate nacelle 102 and hub 20 on a yaw axis 138 to control the perspective of rotor blades 22 1081, 1082, 1083 and rotor 106, respectively, with respect to local wind direction 28. Typically, yaw drive mechanism 56 is operated during normal independent operation with a zero yaw angle setpoint. Accordingly, at least a horizontal component of a yaw angle between yaw axis 138 and local wind direction 28 is aimed to reach zero in order to optimize power uptake of rotor 106 and power production of individual wind turbine 100.

Nacelle 102 typically also includes at least one meteorological mast 113 that includes a wind vane and anemometer (neither shown in FIG. 1). Mast 113 provides information to control system 36 that may include wind direction and/or wind speed.

Figure 2:
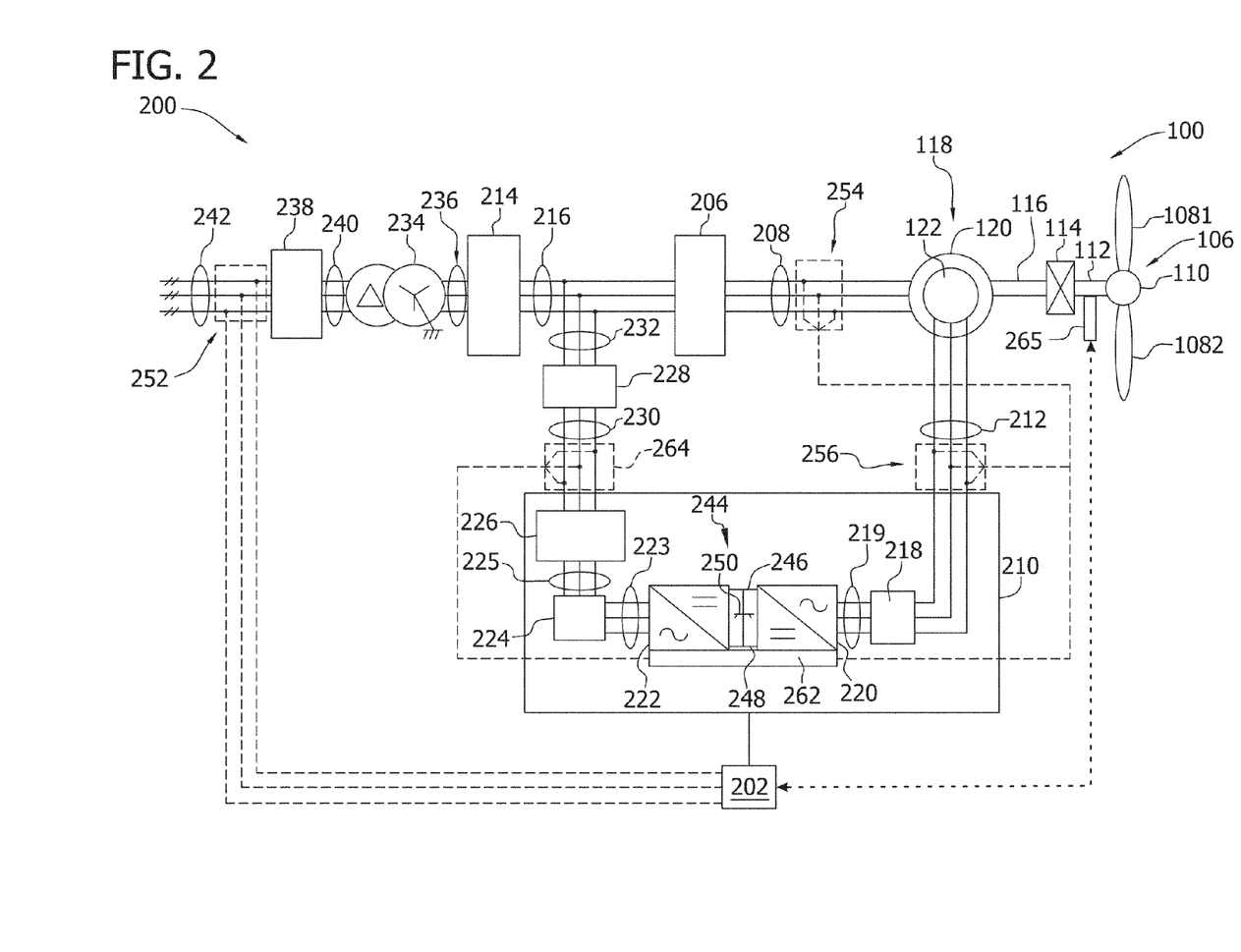
FIG. 2 is a schematic view of an exemplary electrical and control system suitable for use with the wind turbine shown in FIG. 1.

FIG. 2 is a schematic view of an exemplary electrical and control system 200 that may be used with wind turbine 100. Rotor 106 includes blades 1081, 1082 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 1081, 1082 and blades 1081, 1082 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. In the exemplary embodiment, an encoder 265 connected to low-speed shaft 112 or high speed shaft 116 may be used to measure a rotational speed and/or an angular position of the respective shaft and rotor 106, respectively.

High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 1081, 1082. Therefore, in this manner, mechanical and electrical rotor frequencies are decoupled from stator frequency. Accordingly, generator 118 is a variable speed generator.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Figure 3:
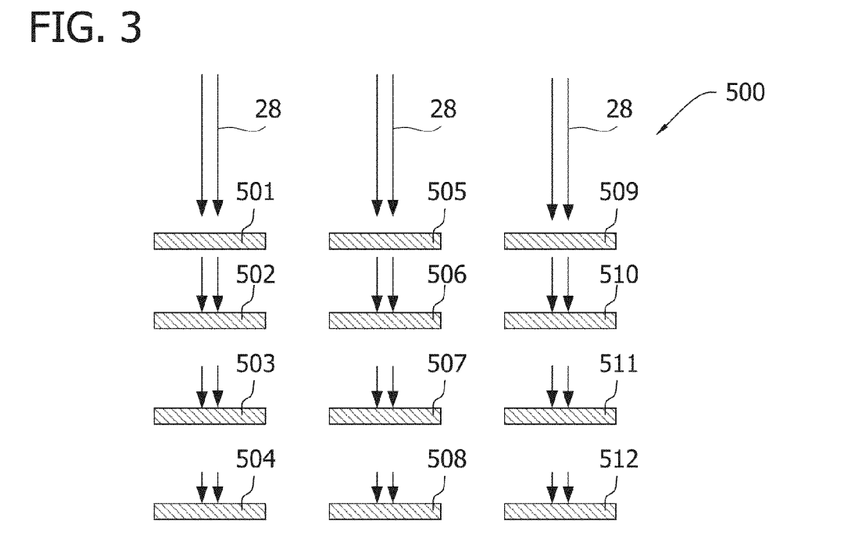
FIG. 3 is a schematic view of a wind farm according to an embodiment.
Figure 4:
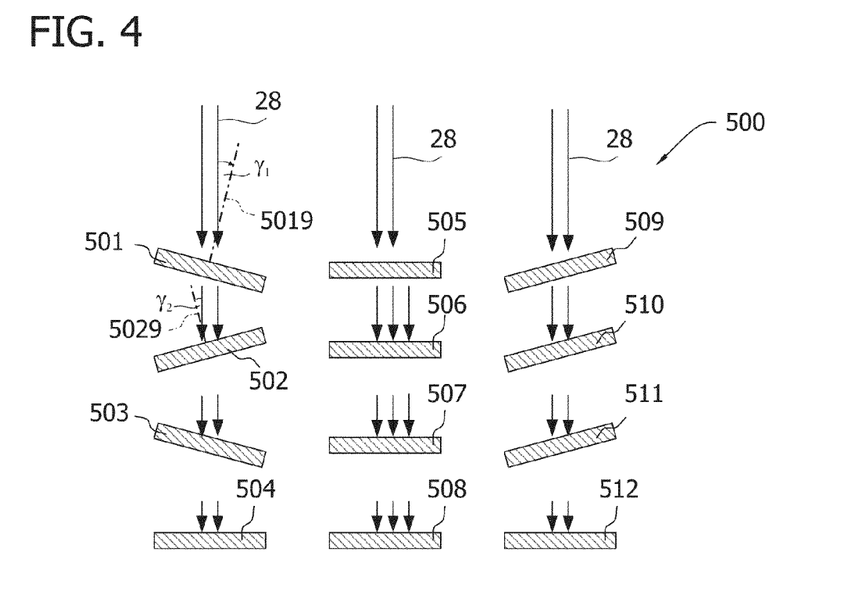
FIG. 4 is a schematic view of the wind farm illustrated in FIG. 3 according to an embodiment.

FIGS. 3 and 4 are schematic views of a wind farm 500. In the exemplary embodiment, wind farm 500 includes twelve wind turbines 501 to 512. This is however only an example. Wind farm 500 may have any number of wind turbines. For sake of clarity, each of the wind turbines 501 to 512 is illustrated as a rectangle representing the rotor plane of its rotor when seen from above. Further, the wind turbines 501 to 512 form, for sake of clarity, a regular two-dimensional grid. The wind turbines of wind farm 500 may also form a non-regular grid which is determined in a so-called micro-sitting phase during planning the wind farm taking into account local conditions, in particular main wind direction and for example the landscape profile in case wind farm 500 is an onshore wind farm. In other embodiments, wind farm 500 is an offshore wind farm.

In the exemplary embodiment illustrated in FIG. 3, the three wind turbines 501, 505, 509 are upstream wind turbines at given wind direction 28. The other wind turbines are down stream wind turbines with respect to the wind turbines 501, 505, 509. Note that the wind turbines 502, 506, 510 in FIG. 3 also represent upstream wind turbines for the wind turbines 503, 504, 507, 508, 511 and 512. Further, wind direction 28 may change during operation of wind farm 500. Accordingly, a wind turbine that is downstream with respect to another wind turbine in FIG. 3 may become upstream with respect to this wind turbine.

Due to wake effects, at least the local wind speed may be reduced for further downstream wind turbines. This is illustrated in FIG. 3 by the length of the arrows representing the local speed which is reduced more strongly the further downstream the wind turbine is located in wind farm 500. Due to power uptake of a further upstream wind turbine, the speed of air flow is reduced behind this wind turbine, for example to about a third of air flow speed in front of this wind turbine. Furthermore, vortices are typically formed behind the rotor of this wind turbine. This is due to the air counteracting the blade torque and in part to aerodynamic effects which are related to the finite size of the rotor blades. As a consequence, a turbulent wake field is typically formed downstream the wind turbine. Accordingly, the wake field produced by a further upstream wind turbine may not only reduce power uptake of a further downstream wind turbine in the wind farm but also increase turbulent loads on the wind rotor of the further downstream wind turbine. Note, that wind deficit and/or wind turbulence measured at the further downstream wind turbine may be used as a measure for the wake effect and wake influence, respectively.

Wake effects may result in significant losses. These losses may amount up to about 40% in terms of the annual energy production (AEP) for certain arrangements of wind turbines. These effects can even be more important for offshore wind farms. Due to the low turbulence intensity, the mixing process that allows a relatively fast recovery of the air flow is very low compared to on-shore wind farms. This means that the wake persists for comparatively long distances.

To avoid wake effects, the wind turbines of a wind farm may be placed in a larger area to reduce the wake-interaction. However, this increases the overall cost. For example, the spacing between the wind turbines may, dependent on the rotor diameter, be larger than about 8 to 12 times the rotor diameters. This reduces the number of turbines to be placed in any given surface and thus creates a commercial disadvantage.

According to an embodiment, the yaw angles of the wind turbines of wind farm 500 are controlled in a coordinated manner such that at given wind condition the overall power production is increased. For this purpose a set of desired yaw angle setpoints consisting of a desired yaw angle setpoint for each of the wind turbines 501 to 512 is typically determined and issued to the wind turbines 501 to 512 such that total power production is expected to be increased and to be greater, respectively, compared to independently operating the wind turbines 501 to 512. Accordingly, the energy capture of wind farm 500 is increased. Independently operating the wind turbines corresponds to a control scheme in which each of the wind turbines 501 to 512 tries to optimize its power production at given load constrains and operating its yaw system during normal operation with a zero yaw angle setpoint, respectively. Accordingly, independently operating the wind turbines 501 to 512 corresponds to aligning the yaw axis of the wind turbines to the local wind direction. Different thereto, coordinated yaw control of the wind turbines, which is in the following also referred to as cooperative yaw control, results in at least temporarily operating at least one of the wind turbines with a non-zero yaw angle setpoint. The wind turbines which are operating with a non-zero yaw angle setpoint may also be referred to as facilitating wind turbines as they facilitate power capture of further downstream wind turbines operating with zero yaw angle setpoint which may also be referred to as normally producing wind turbines.

In the exemplary embodiment, independently operating the wind turbines 501 to 512 as illustrated in FIG. 3 may, due to wake interactions of the wind turbines, do not result in highest possible energy production of wind farm 500. In such a situation, a wind farm control system typically determines and issues a set of desired yaw angle setpoints to the wind turbines so that the overall power production of wind farm 500 is increased. In the exemplary embodiment, the set of desired yaw angle setpoints $\{\gamma_i, i=1 \ldots 12\}$ has non-zero desired yaw angle setpoints for the wind turbines 501, 502, 503, 509, 510, 511. Accordingly, the rotor of these wind turbines will be turned as illustrated in FIG. 4. In the following, curly brackets are used to indicate sets of variables and values, respectively. For sake of clarity, only the rotor axis 5019 and the resulting desired yaw angle $\gamma_1$ of wind turbine 501 as well as the rotor axis 5029 and the resulting desired yaw angle $\gamma_2$ of wind turbine 502 are shown in FIG. 4. While the power production of some of the wind turbines 501, 502, 503, 509, 510, 511 in FIG. 4 may be lowered compared to independently operating them, this is overcompensated by the increased overall power production of the remaining wind turbines. For example, the power production of the wind turbines 501 and 509 which are partly turned out of the wind to deviate the downwind air flow will be reduced, but this is overcompensated by the increased wind speed at the location of the wind turbines 506, 507, 508 as indicated by the additional arrows compared to FIG. 4. This shows that the air flow may be partly focused to some of the wind turbines. Accordingly, a related power production of wind farm 500 may be increased. This is explained in more detail below with regard to FIG. 5. Furthermore, cooperative yaw control may already be taken into account during planning of wind farm, 500 in a micro-sitting phase. Accordingly, the annual power production of wind farm 500 may be further increased and/or the required space of wind farm 500 be reduced.

To realize the cooperative yaw control the following set of sensors per turbine is typically used: an anemometer for wind speed measurement or any other sensor or virtual sensor that delivers the wind speed measurement, for example a wind speed estimator, a turbulence estimator, a wind direction sensor, for example a wind vane, a LIDAR, a vibration measurement system, and a power meter to measure the power delivered to the network.

The information provided by the different sensors may be either centralized a wind farm center where the coordinated control is implemented or distributed over the wind farm. In the latter case each wind turbine may communicate with the other wind turbines and chose its desired yaw angle setpoint such that the power output of the whole wind farm is maximized and such that the loads are kept at acceptable levels.

Figure 5:
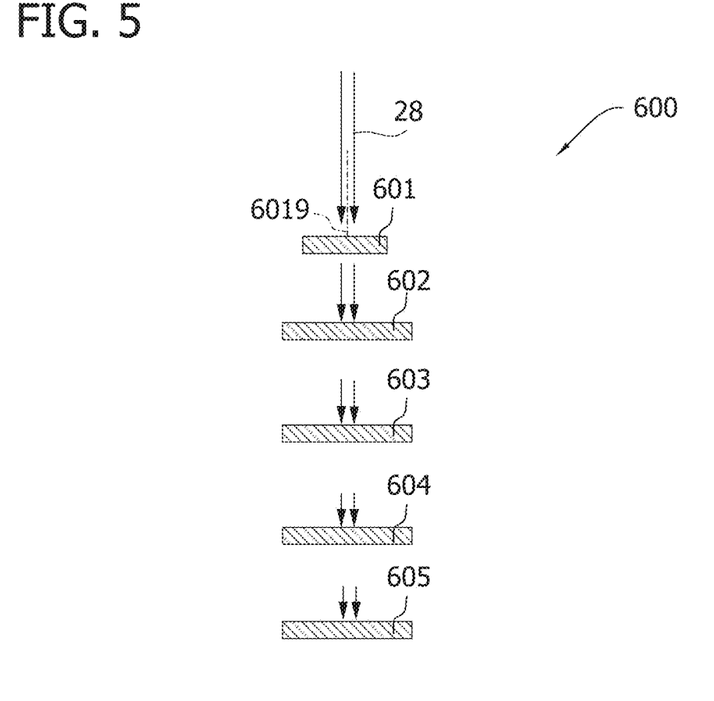
FIG. 5 is a schematic view of a wind farm according to an embodiment.

FIG. 5 is a schematic view of a wind farm 600. Wind farm 600 is similar to the wind farm 500 explained above with regard to FIGS. 3, 4. However, wind farm 600 includes five wind turbines 601 to 605 which are arranged in a row.

Figure 6:
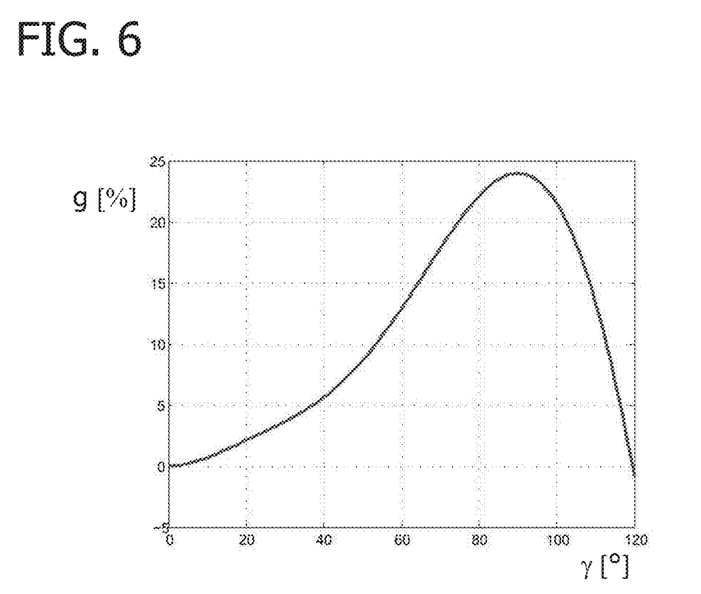
FIG. 6 illustrates a power production of the wind farm illustrated in FIG. 5 according to an embodiment.

In the exemplary embodiment, the most upstream wind turbine 601 has a smaller rotor with respect to the others. FIG. 6 illustrates a calculated overall power production g in % of wind farm 600 as function of the yaw angle γ between wind direction 28 and a rotor axis 6019 of wind turbine 601 and issued desired yaw angle setpoint γ of wind turbine 601, respectively. The other wind turbines 602 to 605 are assumed to be operating with a zero yaw angle setpoint.

For yaw angles γ which are higher than about 12° (or smaller than about −12°) an increase of more than 1% of the overall power production is achievable. Depending on wind speed a maximum yaw angle of about 30° or 40° degrees may not be exceeded to limit mechanical loads of wind turbine 501. Wind turbines that are equipped with an advanced load control which are configured to individually control pitch angles of blades of the rotor may allow higher maximum yaw angles, for example by cyclically adjusting the pitch angles at constant wind condition. Therefore, the wind turbines of the wind farms explained herein typically includes an advanced load control. Accordingly, the annual energy production of the wind farm may be further increased.

Figure 7:
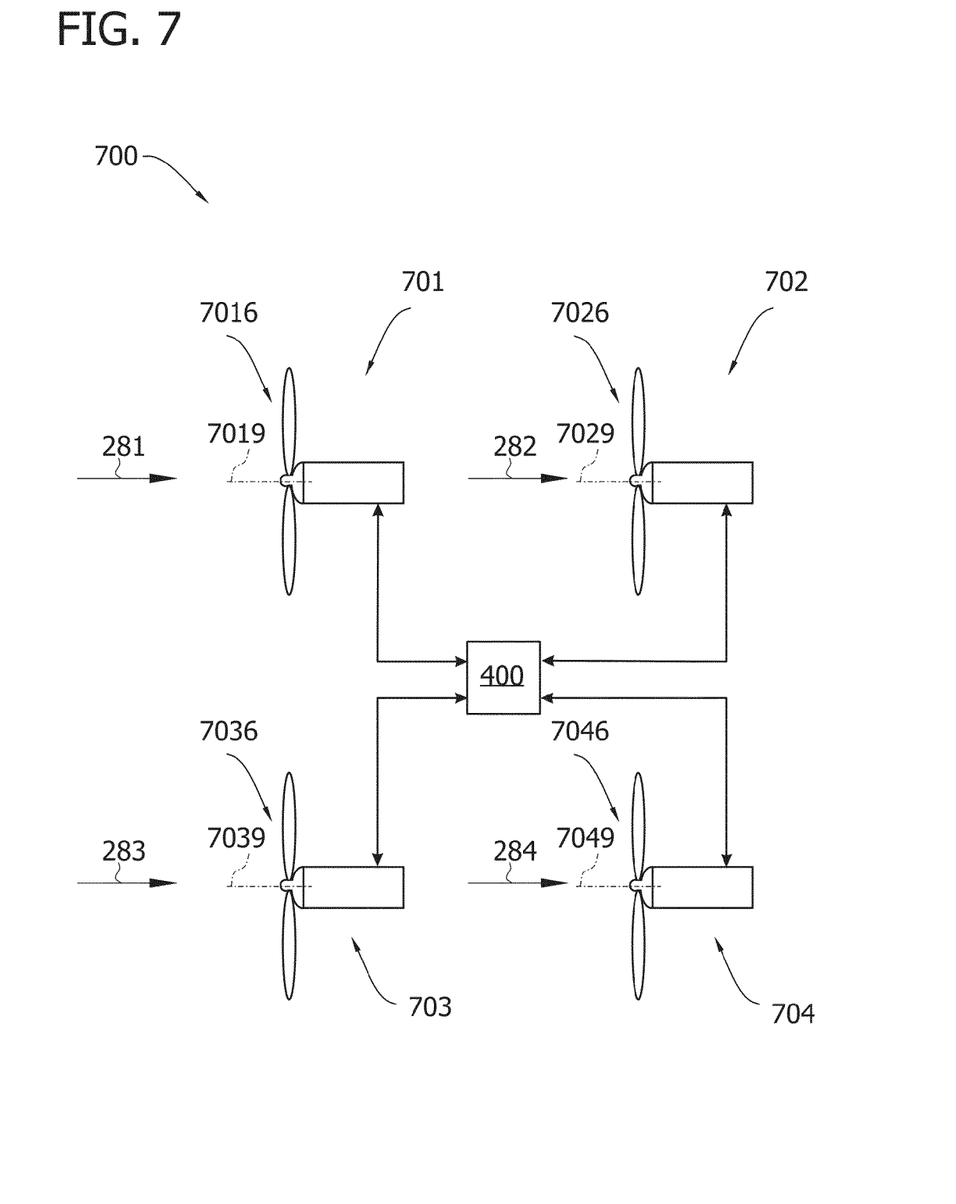
FIG. 7 is a schematic view of a wind farm according to an embodiment.

FIG. 7 is a schematic view of a wind farm 700. Wind farm 700 is similar to the wind farm 500 explained above with regard to FIGS. 3, 4. In the exemplary embodiment, wind farm 700 includes four wind turbines 701, 702, 703, 704 with respective rotors 7016, 7026, 7036, 7046 and a control system 400. Each wind turbine 701, 702, 703, 704 include a yaw system which is configured to adjust a yaw angle between the respective rotor axis 7019, 7029, 7039, 7049 and a local wind direction 282, 282, 283, 284 in accordance with a yaw angle setpoint. As explained above, the control system may be centralized distributed over the wind turbines. This also applies for a wind detecting system of wind farm 700 which is typically configured to determine the local wind direction and the local wind speed for each of the wind turbines 701 to 704. Typically, the wind detecting system includes for each of the wind turbines 701 to 704 a wind vane located on or close to the respective wind turbine, an anemometer located on or close to the respective wind turbine and/or a wind estimator and/or a turbulence intensity estimator.

Figure 8:
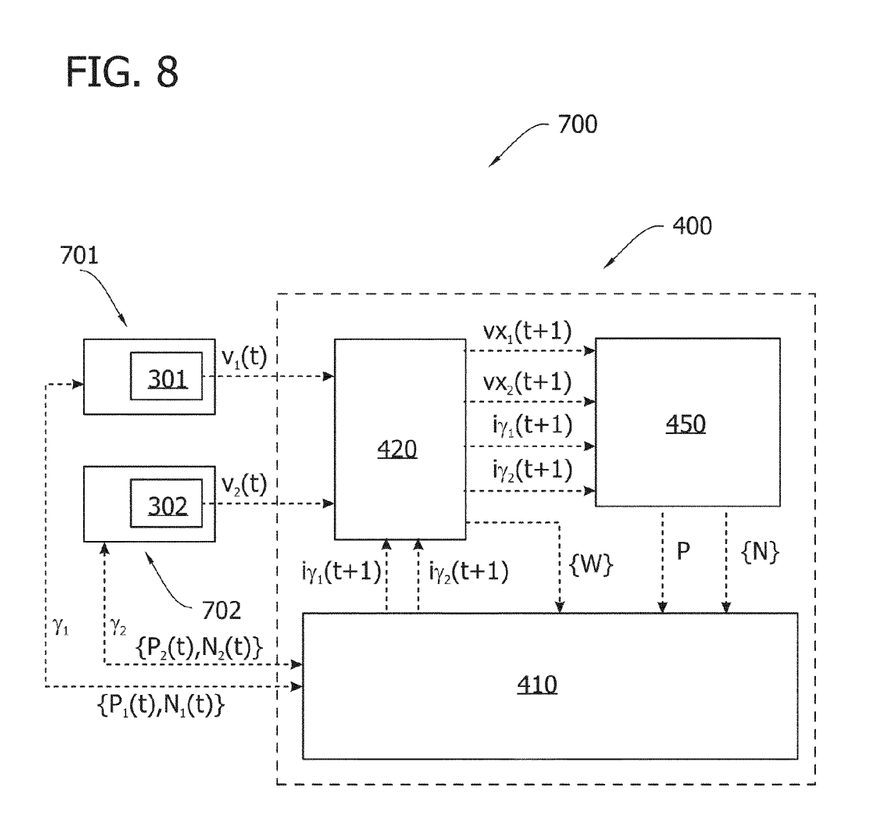
FIG. 8 is a schematic view of a control system of the wind farm illustrated in FIG. 7 according to an embodiment.

FIG. 8 is a schematic view of the control system 400 of wind farm 700. In the exemplary embodiment, the current local wind speeds and local wind directions, i.e. an actual wind condition at current time t $\{v_1(t), v_2(t)\}$, are determined by the wind turbines 701, 702 as indicated by the boxes 301, 302 forming a part of the wind detecting system of wind farm 700. Note that for sake of clarity only two of the four exemplary wind turbines are illustrated in FIG. 8 and that the remaining part of the of the wind detecting system is typically formed by the other wind turbines.

In the exemplary embodiment, control system 400 includes a wind predictor 420 which is connected with the wind turbines 701, 702 and configured to receive the wind condition $\{v_1(t), v_2(t)\}$ and to predict, depending on a set of input values $\{i\gamma_1, i\gamma_1\}$ for the yaw angle setpoints of the wind turbines 701, 702, a corresponding expected wind condition $\{vx_1, vx_2\}$ with expected local wind vectors $vx_1$, $vx_2$ for the wind turbines 701, 702. Wind predictor 420 may perform a hydrodynamic simulation but may also use estimates which may, for example, be based on interpolations between values of look-up tables or the like.

Control system 400 further includes a power and load estimator 450 which is connected with the wind predictor 420. The power and load estimator 450 is configured to receive the expected wind condition $\{vx_1, vx_2\}$ and the set of input values $\{i\gamma_1, i\gamma_1\}$ and to estimate a total power production P of the generators of exemplary two wind turbines 701, 702. Typically, the power and load estimator 450 is also configured to estimate a set of loads $\{N\}$ for the wind turbines 701, 702.

According to an embodiment, the control system 400 is configured to determine a set of desired yaw angle setpoints $\{\gamma_1(t+1), \gamma_2(t+1)\}$ for a forthcoming time t+1 so that the total value of the power production P estimated by the power estimator 450 is larger when the set of desired yaw angle setpoints $\{\gamma_1(t+1), \gamma_2(t+1)\}$ is used as set of input values $\{i\gamma_1(t+1), i\gamma_2(t+1)\}$ compared to using a set of current values of the yaw angle setpoints $\{\gamma_1(t), \gamma_2(t)\}$ of the yaw systems of the wind turbines 701, 702 as set of input values $\{i\gamma_1(t+1), i\gamma_2(t+1)\}$.

Furthermore, the control system 400 is typically connected with the wind turbines and configured to issue the set of desired yaw angle setpoints $\{\gamma_1(t+1), \gamma_2(t+1)\}$ to the wind turbines 701, 702. Accordingly, the overall power production of wind farm 700 may be increased.

For this purpose the control system 400 may include an evaluation module 410 which is connected to the wind predictor 420 and the power and load estimator 450 and configured to feed the set of input values $\{i\gamma_1(t+1), i\gamma_2(t+1)\}$ to the wind predictor 420 and to receive the estimated power production P and typically also the estimates set of loads $\{N\}$ from the power and load estimator 450.

Alternatively or in addition, the set of loads $\{N\}$ may be measured. The loads $\{N\}$ are typically considered as a constraint on the maximization problem which can be formulated as maximize the power P so that the loads $\{N\}$ remain below given load constraints. For example, each of the loads $\{N\}$ may be requested to be lower than a load threshold. Other operability constraints may additionally be included.

In the exemplary embodiment, the evaluation module 410 is connected with the wind turbines 701, 702 and configured to issue the desired yaw angle setpoints $\gamma_1(t+1)$, $\gamma_2(t+1)$ to the respective wind turbines 701, 702. Furthermore, the evaluation module 410 may be configured to receive the current power productions $P_1(t)$, $P_2(t)$ and current load values $N_1(t)$, $N_2(t)$ of wind turbines 701, 702. The current power productions $P_1(t)$, $P_2(t)$ and current load values $N_1(t)$, $N_2(t)$ are typically transferred to the wind predictor 420 where they may also be used as input values to determine expected wind condition. Alternatively, the current power productions $P_1(t)$, $P_2(t)$ and current load values $N_1(t)$, $N_2(t)$ of wind turbines 701, 702 may be directly fed into the wind predictor 420. Furthermore, additional status parameters and/or setpoints, such as pitch angles are typically used as further input values of the wind predictor 420.

To determine set of desired yaw angle setpoints $\{\gamma_1(t+1), \gamma_2(t+1)\}$, the evaluation module 410 may vary the set of input values $\{i\gamma_1(t+1), i\gamma_2(t+1)\}$ and further setpoints such as the pitch angles of the wind turbines 701, 702 for the wind predictor 420 which estimates corresponding expected wind conditions $\{vx_1(t+1), vx_2(t+1)\}$ which are used as inputs to calculate the total power production P and corresponding loads $\{N\}$ in the power and load estimator 450 until the power production P is maximized for the expected wind condition under the constraint that the loads $\{N\}$ remain lower than given load constrains. The used optimization algorithm may be based on a gradient descent of the type extremum seeking that may not require a model of the system to be optimized. Furthermore, other setpoints such as pitch angle setpoints may additionally be optimized and issued to the wind turbines.

According to an embodiment, the control system 400, is configured to determine a wake influence $\{W\}$, for example a set of wake influences between pairs of wind turbines, between at the at wind turbines 701, 702. In the exemplary embodiment, this function is performed by the wind estimator 420. This is however only an example. The evaluation module 420 may only initiate finding the set of desired yaw angle setpoints $\{\gamma_1(t+1), \gamma_2(t+1)\}$ for the next time step t+1 and to issuing the set of desired yaw angle setpoints to the wind turbines 701, 702 when the wake influence $\{W\}$ between at least two wind turbines is higher than a given threshold.

Typically, a relative wind fluctuation of the wind condition, for example of the local wind speed, is used as a measure of the wake influence $\{W\}$. Alternatively or in addition, vibration levels and power fluctuations may be used to determine the wake influence $\{W\}$.

According to an embodiment, a wake model is used to find the optimal yaw angles maximizing the power output of the cluster of the wind farm under yawing at given load constraints.

In a larger wind farm, the used wake detection algorithm may be based on comparison and ranking of the different wind turbines. In the following methods for coordinated yaw control which are typically used by the control system 400 are explained in more detail.

Figure 9:
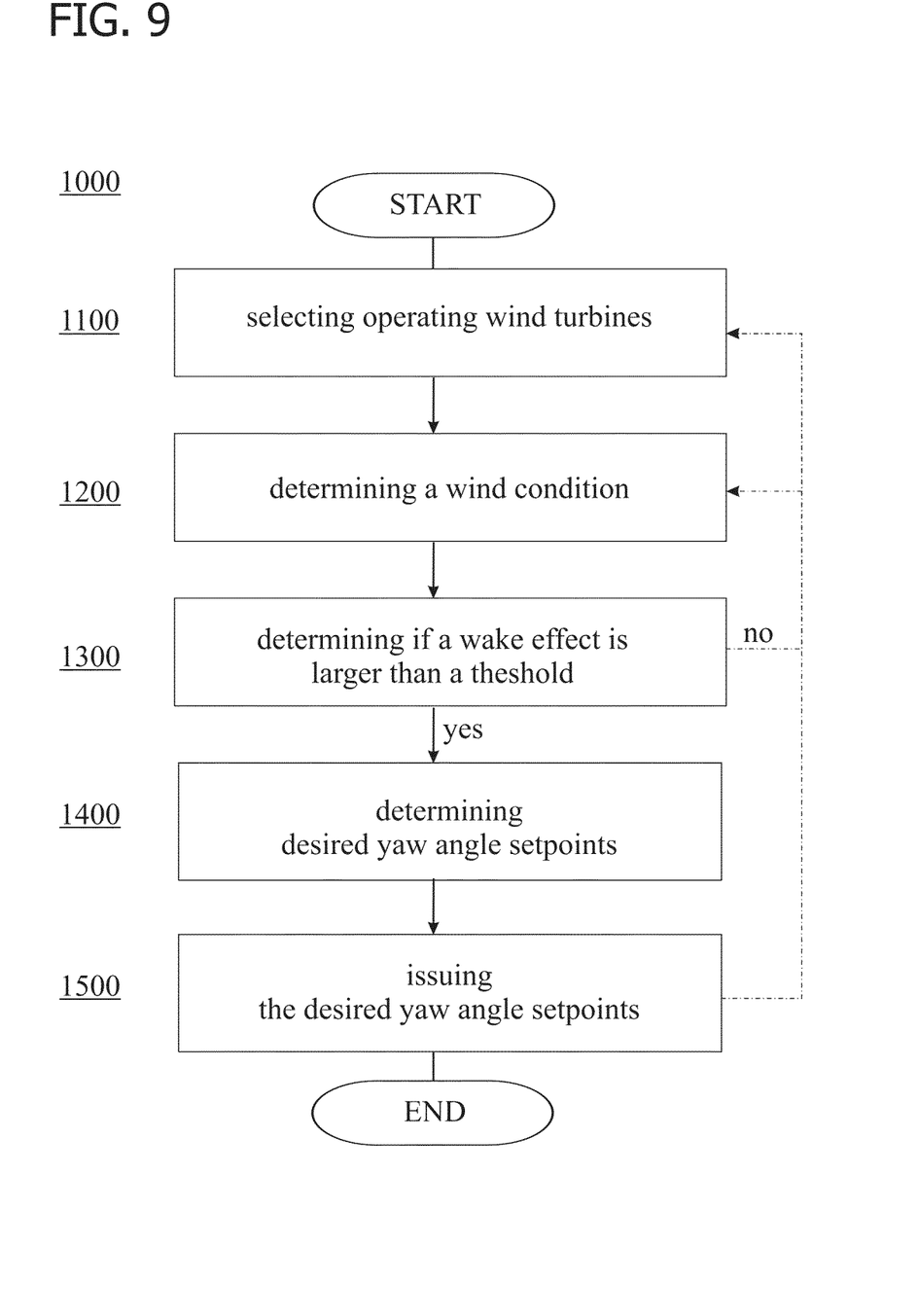
FIG. 9 illustrates a flow diagram of a method for operating a wind farm according to an embodiment.

FIG. 9 is a flow diagram of a method 2000 for operating a wind farm, for example a wind farm as explained above with regard to FIGS. 3 to 8.

In a block 1100, at least two wind turbines of the wind farm are selected. Each of the at least two wind turbines includes a yaw system operating at a respective current yaw angle setpoint. The at least two wind turbines form at least a subset of the wind turbines of the wind farm. In the selection process, information from the wind farm topology, for example the wind turbines position, may be used.

Typically, the wind farm is clustered in several sub-sets that may correspond to different areas or sectors of the wind farm. The method may, however, also be performed for all wind turbines of the wind farm without clustering. Clustering, i.e. dividing the wind farm in sub-sets, will allow a reduction in the computation time by selectively coordinating the yaw angles in a specific region.

According to an embodiment, the clustering is performed offline, for example in a micro-sitting phase.

Furthermore, clustering may change when the ambient wind direction changes. Accordingly, the wind farm control may use—depending on ambient wind direction—different clustering of the wind farm that may have been determined offline, for example in a micro-sitting phase.

In a subsequent block 1200, a wind condition is determined. For example, each wind turbine of the sub-set (or the whole wind farm) sends its actual current values of local wind speed, local wind direction, and/or a current local turbulence intensity as well as actual current values of power production, yaw position and/or vibration level to a centralized control system or to neighboring wind turbines of the sub-set when a distributed control architecture is used. Instead of actual current values short-term averaged values, i.e. values which are averaged over a few seconds or at most a few ten seconds, may be sent. In addition, actual current values for the pitch angles and current load indicators may be sent to the centralized control system and the neighboring wind turbines, respectively. Typically, each wind turbine includes a wind vane for measuring the local wind direction and an anemometer for measuring the local wind speed and/or wind speed estimator and/or a turbulence intensity estimator.

Note that the sequences of blocks 1100 and 1200 may also be reversed, for example when the wind farm control choses a pre-determined clustering of the wind farm depending on ambient wind direction and/or wind speed.

In a subsequent block 1300, it is determined if a wake effect is larger than a given threshold. Typically, a wake detecting algorithm is used for each subset. The wake detecting algorithm typically includes comparing the wind velocity as given by the anemometer of the respective wind turbine to determine a turbulence intensity and/or a wind deficit as a measure of the wake effect. The turbulence intensity may be computed as the standard deviation of the wind divided by the mean wind speed. These quantities may be computed iteratively using a moving average of the wind speed and an iterative standard deviation computation. The turbulence intensity can thus be computed online. This reduces requirements on data storage and may facilitate computation. Furthermore, the turbulence intensity and/or the wind deficit may also be estimated and/or cross-checked using the power production and the pitch activity of the wind turbine using e.g. a dynamic model.

When the wake effect is below or equal to the threshold, the method returns in the next time step to block 1100 or to block 1200 when the wind farm is operated with a fixed clustering. Otherwise, desired yaw angle setpoints are determined in a block 1400 for each of the wind turbines of the sub-set so that a total power production of the sub-set is expected to be increased compared to operating the yaw systems of each of the at least two wind turbines with the respective current yaw angle setpoint at the wind condition. In block 1400 an algorithm may be used that computes a solution to an online optimization problem where the control variables are the yaw angle setpoints of all wind turbines in the sub-set. This may be done similar as explained above with regard to FIG. 8.

For determining desired yaw angle setpoints, the local wind condition, i.e. the wind speeds and directions at the respective location of the wind turbines, are typically predicted for a forthcoming time step during, for example using an aerodynamic model or a simulation taking further into account previously measured local wind vectors, yaw angles, power setpoints and/or pitch setpoints of the wind turbines.

Thereafter, the desired yaw angle setpoints are issued to the wind turbines of the sub-set in a block 1500. Accordingly the power production of at least the sub-set may be increased.

In a next time step the method returns to block 1100 to ensure a closed-loop control of the wind farm.

Instead of determining in block 1300 if the wake effect is below or equal to the threshold, it may be determined if the wake effect is expected to be below or equal to the threshold. This may, for example, be the case when the wind direction deviates from a main or dominant wind direction, which occurs more frequently than other, by a wind speed depending angle.

According to an embodiment, method 100 is performed independently for different subsets of wind turbines of the wind farm, for example in parallel. This ensures that the annual power production of the operating wind farm is increased.

Note that method 1000 may also be used in micro-sitting studies for planning the placement of wind turbines in the wind farm. In this embodiment, the wind conditions which are determined in block 1200 may correspond to typical wind conditions of the area in which the wind farm is to be built. In so doing, the used area of the wind farm may be reduced as the wind turbines may be placed closer to each other and at different positions compared to only consider independently operating wind turbines. This applies also to the method explained with regard to FIG. 10.

Figure 10:
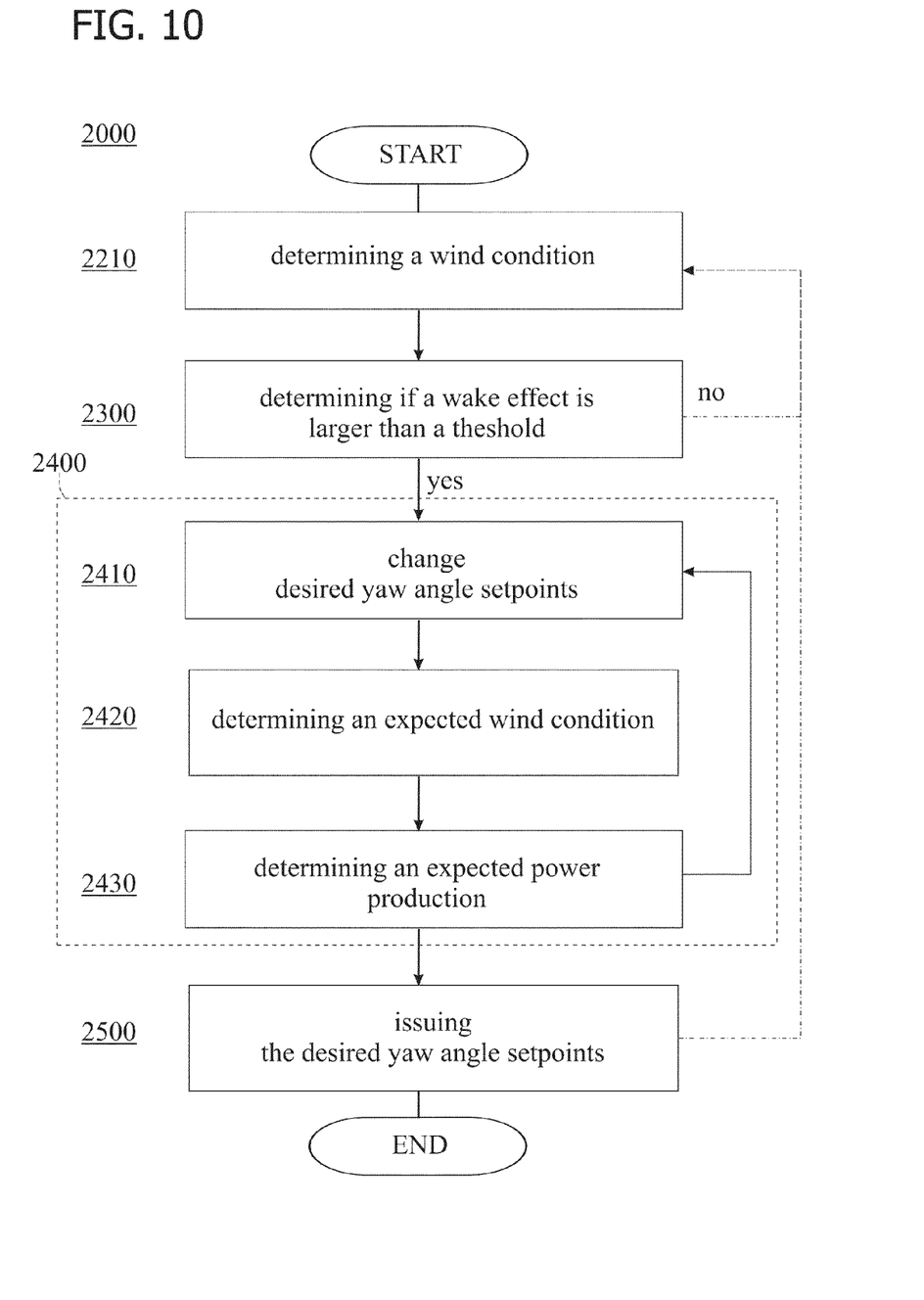
FIG. 10 illustrates a flow diagram of a method for operating a wind farm according to an embodiment.

FIG. 10 is a flow diagram of a method 2000 for operating a wind farm, for example a wind farm as explained above with regard to FIGS. 3 to 7.

Similar as explained above with regard to FIG. 9, a wind condition is determined in a block 2210, and in a subsequent block 2300 it is determined if a wake-effect between at least two wind turbines is larger than a threshold.

For example, wind fluctuations which are measured at the locations of the wind turbines and/or estimated from the power productions of the individual wind turbines may be used as a measure for the wake effect.

If the wake-effect does not exceed the threshold method 2000 returns in the next time step to block 2210 as indicated by the arrow.

Otherwise, method 2000 goes to a sub-loop 2400 to determine a desired yaw angle setpoints for the wind turbines so that a total power production of the wind turbines is expected to be increased compared to independently operating the yaw systems of the wind turbines.

In the exemplary embodiment, sub-loop 2400 is implemented as a repeat-until loop. First, a set of desired yaw angle setpoints is changed in a block 2410. Thereafter, expected local wind conditions, typically expected local wind vectors, which correspond to the air flow when the wind turbines are operated with set of desired yaw angle setpoints are determined in a block 2420. The expected local wind conditions may be estimated using a simulation of the wind flow at least downwind the most upwind wind turbines of the wind farm.

Thereafter, a resulting expected power production is calculated in a block 2430.

The sub-loop 2400 it is typically carried out until the expected power production is substantially maximized at given maximum acceptable loads for the wind turbines.

Thereafter, the desired yaw angle setpoints are issued to the wind turbines and used for controlling the yaw systems of the wind turbines in a block 2500.

Method 2000 typically also controls the wind farm in a closed-loop manner. Accordingly, method 2000 typically returns to block 2210 in the next time step.

According to an embodiment, method 2000 is performed independently for different sub-sets of wind turbines of the wind farm that may be clustered as explained above with regard to FIG. 9.

The above-described systems and methods facilitate increasing the annual energy production of wind farms and/or the used area of a wind farm by coordinated yaw control. More specifically, the yaw control is coordinated at least for a sub-set of wind turbines of the wind farm. Accordingly, a wake interaction between the wind turbines of at least the subset may be reduced in such a way that overall power production of at least the subset is increased.

According to an embodiment, a method for operating a wind farm includes determining a wind condition, determining a wake-effect between at least two wind turbines forming at least a sub-set of the wind farm, each of the at least two wind turbines having a yaw system, and determining a desired yaw angle setpoint for each of the at least two wind turbines so that a total power production of at least the subset is increased or at least expected to be increased compared to independently operating the yaw systems of each of the at least two wind turbines.

According to an embodiment, a method for operating a wind farm includes selecting at least two wind turbines of the wind farm, each of the at least two wind turbines comprising a yaw system operating at a respective current yaw angle setpoint, the at least two wind turbines forming at least a sub-set of the wind turbines of the wind farm, determining a wind condition, and determining a desired yaw angle setpoint for each of the at least two wind turbines so that a total power production of the sub-set is increased or at least expected to be increased compared to operating the yaw systems of each of the at least two wind turbines with the respective current yaw angle setpoint at the wind condition.

Exemplary embodiments of systems and methods for operating a wind turbine and a wind farm are described above in detail. The systems and methods are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind farm, comprising:
selecting at least two wind turbines forming at least a subset of the wind farm, each of the at least two wind turbines comprising a yaw system operating at a respective first yaw angle setpoint relative to a vertical axis;
determining, by one or more controllers, a wind condition based at least in part on one or more wind measurements;
in response to determining the wind condition, performing operations, the operations comprising:
determining, by the one or more controllers, a wake-effect between the at least two wind turbines based at least in part on the wind condition;
determining, by the one or more controllers, a second yaw angle setpoint for at least one of the at least two wind turbines based at least in part on the wake-effect so that a total power production of at least the sub-set is greater compared to operating the yaw systems of each of the at least two wind turbines at the respective first yaw angle setpoint; and
operating, by the one or more controllers, the yaw system of at least one of the at least two wind turbines to adjust the yaw angle of the at least one wind turbine from the first yaw angle setpoint to the second yaw angle setpoint for the at least one wind turbine,
wherein determining the second yaw angle setpoint comprises estimating an expected local wind vector for at least one of the at least two wind turbines using at least the wind condition as an input.

2. The method of claim 1, wherein estimating the expected local wind vector comprises simulating a wind flow downwind at least one of the at least two wind turbines.

3. The method of claim 1, wherein the second yaw angle setpoint is only determined when the wake influence is higher than a predefined threshold.

4. A method for operating a wind farm, comprising:
operating at least two wind turbines forming at least a sub-set of the wind farm, each of the at least two wind turbines comprising a yaw system operating at a respective first yaw angle setpoint relative to a vertical axis;
determining an expected wind condition for a forthcoming time period that is different from a current wind condition;
determining a wake-effect for at least one of the at least two wind turbines forming a down-stream wind turbine;
only when the wake-effect is higher than a predefined threshold, determining a second yaw angle setpoint based at least in part on the expected wind condition for at least one of the at least two wind turbines so that an expected total power production of the sub-set is greater compared to operating the yaw systems of each of the at least two wind turbines with the respective first yaw angle setpoint at the expected wind condition; and
operating the yaw system of at least one of the at least two wind turbines such that the yaw angle of the at least one wind turbine is adjusted from the first yaw angle setpoint to the second yaw angle setpoint for the at least one wind turbine.

5. A wind farm comprising:
at least two wind turbines each of which comprises a rotor comprising a rotor axis, a generator connected to the rotor, and a yaw system which is configured to adjust a yaw angle between the rotor axis and a local wind direction in accordance with a yaw angle setpoint;
a wind detecting system which is configured to determine a wind condition comprising the local wind direction and a local wind speed for each of the at least two wind turbines; and,
a control system which is configured to detect a wake influence in response to the wind condition between at least two of the at least two wind turbines operating at a respective first yaw angle setpoint and to determine a second yaw angle setpoint for at least one of the at least two wind turbines based at least in part on the wake influence for each of the at least two wind turbines so that a total power production of the at least two wind turbines is greater compared to operating the yaw systems of each of the at least two wind turbines at the wind condition at the respective first yaw angle setpoint;
wherein the control system is further configured to operate the yaw system of each of the at least two wind turbines to adjust the yaw angle relative to a vertical axis of at least one of the at least two wind turbines from the first yaw angle setpoint to the second yaw angle setpoint for the at least one wind turbine, and
wherein the control system is further configured to calculate a relative wind fluctuation of the wind condition as a measure of the wake influence.

6. The wind farm of claim 5, wherein the control system comprises at least one of:
a wind predictor configured to receive the wind condition and to predict, depending on a set of input values for the yaw angle setpoints, an expected wind condition comprising an expected local wind vector for each of the at least two wind turbines; and,
a power and load estimator configured to receive the expected wind condition and the set of input values, and configured to estimate a total power production of the generators of the at least two wind turbines,
wherein the control system is configured to determine a set of second yaw angle setpoints so that the total value of the power production estimated by the power estimator is larger when the set of second yaw angle setpoints is used as set of input values compared to using the first yaw angle setpoints of the yaw systems of the at least two wind turbines as set of input values.

* * * * *